(12) United States Patent
Yueh

(10) Patent No.: US 7,747,831 B2
(45) Date of Patent: *Jun. 29, 2010

(54) HIGH EFFICIENCY PORTABLE ARCHIVE AND DATA PROTECTION USING A VIRTUALIZATION LAYER

(75) Inventor: Jedidiah Yueh, Irvine, CA (US)

(73) Assignee: EMC Corporation, Hopkinton, MA (US)

( * ) Notice: Subject to any disclaimer, the term of this patent is extended or adjusted under 35 U.S.C. 154(b) by 462 days.

This patent is subject to a terminal disclaimer.

(21) Appl. No.: 11/688,203

(22) Filed: Mar. 19, 2007

(65) Prior Publication Data

US 2008/0013365 A1    Jan. 17, 2008

Related U.S. Application Data

(60) Provisional application No. 60/784,022, filed on Mar. 20, 2006.

(51) Int. Cl.
G06F 13/00 (2006.01)

(52) U.S. Cl. .............................. 711/162; 711/6; 711/161

(58) Field of Classification Search .................... 711/6, 711/161, 162; 365/149
See application file for complete search history.

(56) References Cited

U.S. PATENT DOCUMENTS

| | | | |
|---|---|---|---|
| 5,642,505 A | 6/1997 | Fushimi | |
| 5,764,972 A | 6/1998 | Crouse et al. | |
| 6,275,953 B1 | 8/2001 | Vahalia et al. | |
| 6,732,293 B1 | 5/2004 | Schneider | |
| 6,795,966 B1 * | 9/2004 | Lim et al. | 718/1 |
| 6,865,655 B1 | 3/2005 | Andersen | |
| 7,096,316 B1 * | 8/2006 | Karr et al. | 711/114 |
| 7,149,858 B1 * | 12/2006 | Kiselev | 711/162 |
| 7,277,905 B2 | 10/2007 | Randal et al. | |
| 7,343,459 B2 | 3/2008 | Prahlad et al. | |
| 7,346,623 B2 | 3/2008 | Prahlad et al. | |
| 7,437,506 B1 | 10/2008 | Kumar et al. | |
| 7,500,001 B2 | 3/2009 | Tameshige et al. | |
| 2002/0069335 A1 | 6/2002 | Flylnn, Jr. | |

(Continued)

FOREIGN PATENT DOCUMENTS

EP    0774715 A1    5/1997

(Continued)

OTHER PUBLICATIONS

U.S. Appl. No. 11/968,040, filed Dec. 31, 2007, Jedidiah Yueh.

(Continued)

Primary Examiner—Mardochee Chery
(74) Attorney, Agent, or Firm—Workman Nydegger

(57) ABSTRACT

A high efficiency portable archive implements a storage system running on a virtualization layer to archive point-in-time versions of a raw data set and the storage system itself as a virtual system on archive media. The high efficiency portable archive can be implemented in a variety of computer architectures. The virtualization layer presents to the storage system a normalized representation of a set of hardware based on components of the computer architecture, shielding the storage system from the actual hardware components of the computer architecture. The storage system and point-in-time versions of the raw data set can be restored to any hardware subsystem that supports the virtual system.

12 Claims, 4 Drawing Sheets

U.S. PATENT DOCUMENTS

| | | |
|---|---|---|
| 2004/0225659 A1 | 11/2004 | O'Brien et al. |
| 2005/0125513 A1 | 6/2005 | Sin-Ling Lam et al. |
| 2005/0160243 A1 | 7/2005 | Lubbers et al. |
| 2005/0235288 A1 | 10/2005 | Yamakabe et al. |
| 2006/0059207 A1 | 3/2006 | Hirsch et al. |
| 2007/0174566 A1 | 7/2007 | Kaneda et al. |
| 2008/0215474 A1 | 9/2008 | Graham |
| 2008/0215796 A1 | 9/2008 | Lam et al. |
| 2008/0313371 A1 | 12/2008 | Kedem et al. |
| 2009/0222496 A1 | 9/2009 | Liu et al. |

FOREIGN PATENT DOCUMENTS

| | | |
|---|---|---|
| WO | 99/09480 | 2/1999 |
| WO | 99/12098 | 3/1999 |
| WO | 02/37689 A1 | 5/2002 |
| WO | 2006/017584 A2 | 2/2006 |

OTHER PUBLICATIONS

U.S. Appl. No. 11/739,311, filed Apr. 24, 2007, Jedidiah Yueh.
U.S. Appl. No. 11/772,183, filed Jun. 30, 2007, Jedidiah Yueh.
U.S. Appl. No. 11/739,311, mail date Sep. 21, 2009, Office Action.
U.S. Appl. No. 11/772,183, mail date Sep. 15, 2009, Office Action.
U.S. Appl. No. 11/968,040, mail date Sep. 17, 2009, Office Action.
U.S. Appl. No. 11/746,399, filed May 9, 2007, Jedidiah Yueh et al.
U.S. Appl. No. 11/747,567, filed May 11, 2007, Scott Ogata et al.
U.S. Appl. No. 11/968,040, filed Mar. 9, 2010, Final Office Action.
U.S. Appl. No. 11/739,311, filed Mar. 1, 2010, Final Office Action.
U.S. Appl. No. 11/746,399, filed May 14, 2009, Office Action.
U.S. Appl. No. 11/746,399, filed Dec. 14, 2009, Final Office Action.
U.S. Appl. No. 11/747,567, filed Sep. 30, 2009, Office Action.
U.S. Appl. No. 11/747,567, filed Feb. 24, 2010, Final Office Action.
U.S. Appl. No. 11/772,183, filed Feb. 24, 2010, Final Office Action.

* cited by examiner

HIGH EFFICIENCY PORTABLE ARCHIVE AND DATA PROTECTION USING A VIRTUALIZATION LAYER

CROSS-REFERENCE TO RELATED APPLICATIONS

This application claims the benefit of U.S. Provisional Application Ser. No. 60/784,022, filed Mar. 20, 2006 and entitled HIGH EFFICIENCY PORTABLE ARCHIVE, which application is incorporated by reference in its entirety.

BACKGROUND OF THE INVENTION

1. The Field of the Invention

The present invention relates to data storage and back-up solutions for archiving data and recovering data. More particularly, embodiments of the invention relate to software, hardware, systems, and methods for providing data protection in a manner that allows a user or customer to obtain a copy of information or stored data from a selected point of time and that provides for high efficiency data archiving and data portability.

2. The Relevant Technology

The need for reliable backup and archiving of information is well known. Businesses are devoting large amounts of time and money toward information system (IS) resources that are devoted to providing backup and archive of information resident in computers and servers within their organizations that produce and rely upon digital information. The customers of the data storage industry are more frequently demanding that not only is their data properly backed up but also that when needed, such as after a system failure that causes a loss of data, that the backed up data be accessible at a particular point in time. In other words, there is an increasing demand for almost continuous data protection that allows data to be restored back to its state at a particular moment in time, which is most commonly a point in time just before their computer or data storage system crashed or was lost. The demand for point-in-time data protection, though, must also be balanced against the demand for low data storage costs, and typically, high speed optical and disk storage systems are more expensive to use as archive storage than tape-based data storage systems.

Driven by this demand for point-in-time archives and the growth of data storage, new technologies have emerged that store multiple versions or points in time of the primary data on disk storage using high efficiency techniques. These techniques allow multiple copies of the data, i.e., a data set "N" having a particular size from different points in time (e.g., data sets N1, N2, N3—where the numbers 1, 2, 3 represent different points in time at which changes may have been made to data set N), to be stored in a way that consumes far less capacity in a disk or optical data storage device or system than simply storing the data in its native state. For example, a high efficiency disk storage system might store the data sets N, N1, N2, and N3 in less than the total size of the original data set, N, or at least, using less storage capacity than the sum of the sizes of the data sets N+N1+N2+N3.

Today, there are multiple software- or application-based approaches to storing copies of data in a highly efficient manner in order to provide point-in-time copies of data for backup, restore, and disaster recovery. These technologies include, but are not limited to, snapshots, file differencing techniques, content addressed storage systems, and systems that eliminate redundant data components that may be variable in size. While providing a more efficient method of archiving data, all of these systems use disk storage as their primary storage mechanism rather than less expensive tape media or tape storage systems.

Also, despite the existence of these high efficiency storage technologies, businesses still often need to store or move data onto alternate archive systems that may utilize removable tape media, optical storage, or other disk storage systems that may be less expensive or have different management attributes. In some cases, these archives are required to meet regulatory or other requirements. A problem with such archives is that they are often highly inefficient, e.g., with archiving involving expanding the data back into its original state for archive purposes (N+N1+N2+N3). Another problem with such archives is that the data is stored in such a fashion that it cannot be easily ported, restored, or managed in the future due to the proprietary nature of an implemented high efficiency storage methodology. For example, copying all of the volumes of a primary storage system using block-based snapshots to tape will yield a high efficiency dataset, but one that cannot be independently read or utilized without restoring the data to a system that matches the physical characteristics of the original hardware platform.

As a result, existing backup and archiving techniques do not meet the needs of data storage customers, and there is a continuing need for enhanced techniques for providing continuous or near continuous data protection. Such techniques preferably can be implemented using existing data storage hardware in a highly efficient manner but with enhanced portability.

BRIEF SUMMARY

Embodiments of the present invention are directed to systems and methods for data storage and data archiving. A storage application running on a virtualization layer generates point-in-time versions of a raw data set stored in a storage device. The storage application may compress, minimize, or otherwise reduce the size of the point-in-time versions of the raw data set. The storage application and versions of the raw data set can be archived as a virtual system onto archive media. The storage application and versions of the raw data set can be restored to any hardware subsystem that supports the virtual system.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Figure 1:
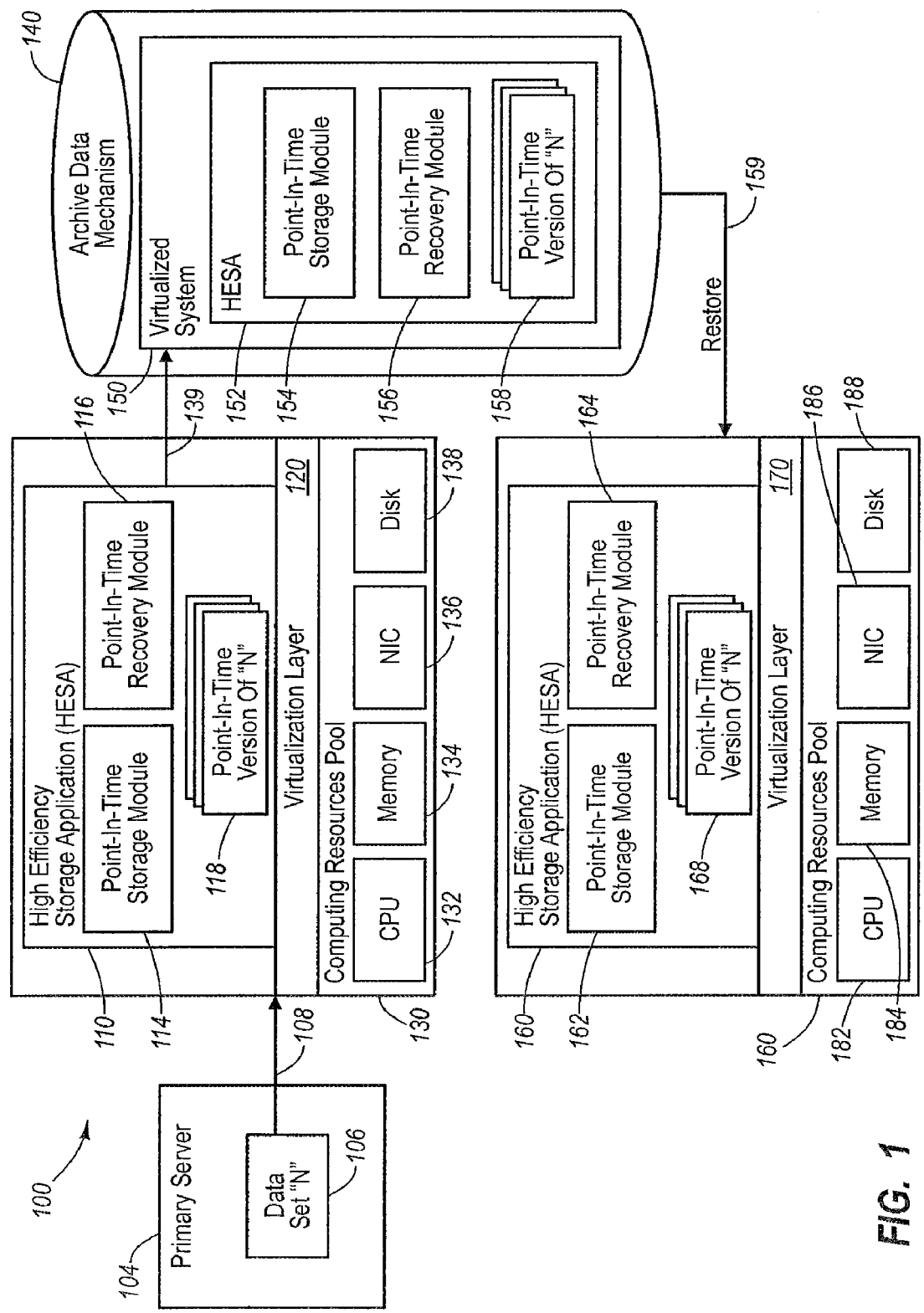
FIG. 1 illustrates in block diagram form a high efficiency portable archive (HEPA) system according to one embodiment of the invention.

Reference will now be made to the drawings to describe various aspects of exemplary embodiments of the invention. It should be understood that the drawings are diagrammatic and schematic representations of such exemplary embodiments and, accordingly, are not limiting of the scope of the present invention, nor are the drawings necessarily drawn to scale.

The present invention is directed to methods and systems for providing high efficiency portable archives, i.e., archival data protection. One embodiment of a high efficiency portable archive (HEPA) system may include or use a high efficiency storage system. Second, it may include a virtualization layer to shield the high efficiency storage system from the actual hardware devices. Third, the HEPA system may use or include an external archive mechanism, such as a tape-based data storage system.

By running the high efficiency storage system on a virtualization layer, the entire high efficiency storage system can be archived as a virtual system onto archive media such as tape storage. This archive can then be restored to any hardware subsystem that supports the virtual system, and all of the versions of the data stored in the high efficiency storage system can be recovered or accessed from the high efficiency storage system itself Using the terminology provided above, a HEPA system of the present invention is made up of a high efficiency storage system that can store multiple point-in-time versions of a dataset N, i.e., N, N1, N2, N3, etc., in less space than the sum of the sizes of the datasets, i.e., the sum of the sizes of N+N1+N2+N3. The high efficiency storage system may be run upon a virtualization layer, such as in a virtual machine (VM), that is provided in a standard computer architecture (such as an x86 architecture or the like). The virtualization layer virtualizes the hardware devices from the high efficiency storage system. The high efficiency storage system is archived as a virtual system onto archive media of the HEPA system, such as tape, optical, or disk storage, so that the high efficiency archive in the archive media can be ported onto any hardware subsystem that supports the virtual system. This allows the recovery of the stored datasets (N+N1+N2+N3) according to the recovery methodology of the original high efficiency storage system. A practical example of this invention would be to use EMC's Avamar software running on VMware ESX and archiving a copy of the VMguest instance of Avamar to a tape archive.

To practice the invention, the computer and network devices may be any devices useful for providing the described functions, including well-known data processing and storage and communication devices and systems such as computer devices typically used as hosts in user systems with processing, memory, and input/output components, and server devices configured to maintain and then transmit digital data over a communications network. Data typically is communicated in digital format following standard communication and transfer protocols. The data storage resources are generally described as disk, optical, and tape devices that implement RAID and other storage techniques and that may use SCSI and other I/O, data transfer, and storage protocols, but the invention is not intended to be limited to the exemplary embodiments or to specific hardware and storage mechanisms as it is useful for nearly any data storage arrangement in which archives of digital data, such as data volumes, are generated and maintained.

FIG. 1 illustrates in simplified block form an exemplary high efficiency portable archive (HEPA) system 100 according to the invention. The system 100 includes one or more primary servers 104 that are storing a data set N for which it is desired to provide archival back up or data protection. As shown the HEPA system 100 includes a high efficiency storage application (or system) 110 that is generally any software-based or implemented technique for processing data, i.e., raw data sets, and to create data sets of reduced size for storage or back ups. As shown, the storage application 110 includes a point-in-time storage function or module 114 that is used to generate compressed or otherwise more storage efficient versions for data sets, such as point-in-time versions of data sets that are significantly smaller in size than the original set being backed up or copied. Also, the storage application includes a data recovery methodology or module 116 that allows a set of point-in-time data sets to be restored or recovered after they have been stored in an efficient manner using the storage application 110 (e.g., the module 114 or the like). For example, the storage application 110, in the point-in-time storage module 114 or other modules not shown, may employ one or more of the following technologies: snapshots, file differencing techniques, content addressed storage systems, continuous data protection (CDP), and systems that eliminate redundant data components that may be variable in size. In one embodiment, the storage application 110 implements commonality factoring technology, described in more detail in U.S. Pat. No. 6,810,398, which is herein incorporated by reference in its entirety.

Significantly, the HEPA system 100 includes a computing resources pool 130 that includes all computer resources for the system 100 such as processors/CPUs, memory, network devices (including NICs), servers, and memory/storage devices. The particular arrangement of the computer resources in pool 130 is not limiting to the invention with the storage application 110 using the resources for storing processed data (e.g., compressed or otherwise reduced-in-size data sets), recovered or restored data sets, and information/data used by the storage application 110 (such as by point-in-time data storage module 114 and recovery module 116) in efficiently storing and/or recovering the archived data. In this regard, the pool 130 includes a CPU 132, memory 134, an NIC 136, and disk 138. The memory 134 and/or disk 138 may be used to store processing information for the storage application 110.

As shown at 108, the high efficiency storage application 110 functions to process the data set 106 to generate high efficiency point-in-time versions of N 118. The data set N 106 may be data of a host or client (not shown) of the storage application 110, and the host/client may utilize the high efficiency storage application 110 to store or archive the raw data 106 to comply with its inside (or outside) regulatory agencies in an external data mechanism or system 140, which typically includes point-in-time versions of the data set N (as shown in FIG. 1). The processed data 118 may take numerous forms to practice the invention but preferably is stored in a manner that is reduced in size relative to the number of versions when the virtualized system including the point-in-time versions is later stored in archive 140 (e.g., the archived data is not simply the size of the data set N 106 multiplied by the number of versions but instead is some smaller size as the point-in-time versions 118 are typically smaller or more efficient versions), with the size and form of the versions 118 varying with the particular implementation of the storage application 110.

To provide an archived or protected version of the data set N at various points-in-time, as shown at 139, the high efficiency storage application 110 including the point-in-time versions of N 118 are stored in an archive data mechanism 140 as shown as virtualized system 150. The virtualized system 150 includes a high efficiency storage application 152 with its storage module 154 and recovery module 156 as well as the point-in-time versions of N 158. By storing the entire virtualized machine 150 in the archive mechanism 140 (which typically is an external device or system relative to the pool 130), a request to recover or restore the data set 106 at a particular point-in-time can be responded to as shown at 159 by providing a new virtual machine on a different virtualization layer 170 that includes a high efficiency storage application 160 generated based on the archived version 152.

The storage application 160 typically includes a point-in-time storage module 162 and a data recovery module 164. The recovery module 164 may be used to respond to a host/client request to recover or restore a raw set of data N 106 to a particular point in time (or to otherwise recover from a loss of data, a data corruption, or the like). To this end, the system 100 is adapted such that the storage application 160 can port to the archive data mechanism 140 to access the point-in-time versions of N 158 so as to recover the data 168 on a hardware subsystem of the pool 180, which may include a CPU 182, memory 184, an NIC 186, and disk 188 or other devices. Such a recovery is performed using the data recovery tool or module 164 of the storage application 160 and can be performed on any hardware system, such as pool 180, that supports virtualization of application 110 even though the components of pool 180 may differ from pool 130.

More specifically, the storage applications 110, 160 use virtualization layers 120, 170 to shield the high efficiency storage application 110, 160 from the actual hardware devices in the pools 130, 180. The use of virtualization layers 120, 170 to run the storage applications 110, 160 (e.g., as a guest or virtual machine with its own operating system or with a host operating system) allows the virtual system 150 to be archived onto the archive data mechanism 140. Then, the high efficiency archive 150 can be ported onto a new hardware subsystem (which can be one or more hardware devices within pool 170 that is capable of supporting the virtual system 150), and the stored data sets can be recovered as shown at 168 (e.g., as N+N1+N2+ . . . +Nx) according to the recovery methodology 164 of the original high efficiency storage system 110. The system 170 does not have to match the physical characteristics of the hardware platform/components used to create the archived data 158 (as was the case with prior archival systems).

The virtualization layers 120, 170 may take a number of forms to practice the invention. Generally, the virtualization layers 120, 170 are selected to act as an abstraction layer that decouples the physical hardware from the operating system associated with storage applications 110, 160 to deliver greater IS resource utilization and flexibility. Virtualization by layers 120, 170 allows multiple virtual machines or guest machines (such as may be used to run applications 110, 160), with heterogeneous operating systems, to run in isolation but side-by-side on the same or a different physical machine (not shown in FIG. 1). Each virtual machine has its own set of virtual hardware (e.g., RAM, CPU, NIC, etc. within the pools 130, 180) upon which an operating system and applications including the storage applications 110, 160 are loaded. The operating system sees a consistent, normalized set of hardware regardless of the actual physical hardware components.

In general, virtual machines are encapsulated into files, making it possible to rapidly save, copy and provision a virtual machine. Full systems (fully configured applications, operating systems, BIOS and virtual hardware) can be moved, within seconds, from one physical server to another for zero-downtime maintenance and continuous workload consolidation. The portable or moved virtual machine with the storage application 110, 160 can be used to recover the point-in-time data set N 168 from the archive data mechanism 140 using recovery module 164. The virtualization layer 120, 170 may provide partitioning such that multiple applications, such as more than one version or instance of storage application 110, 160, and operating systems can be supported within a single physical system. Servers in the pools 130, 180 can be consolidated into virtual machines on either a scale-up or scale-out architecture, and computing resources are treated as a uniform pool 130, 180 to be allocated to virtual machines in a controlled manner, such as a guest machine (not shown) running the storage applications 110, 160 on virtualization layers 120, 170.

The virtualization layers 120, 170 also provide isolation. Virtual machines are completely isolated from the host machine and other virtual machines. If a virtual machine crashes, all others are unaffected. Data does not leak across virtual machines and applications can only communicate over configured network connections. The virtualization layers 120, 170 preferably also are configured or selected to provide encapsulation. In these embodiments, a complete virtual machine environment, e.g., a guest machine with storage application 110 or 160, is saved as a single file that is easy to back up, move, and copy in the system 100 as shown at 139 to archive data mechanism 140. The virtualization layers 120, 170 provide standardized virtualized hardware to the applications 110, 160, which guarantees compatibility or portability of the application 110 and the archives 168 that can be recovered via the storage application 160.

Figure 2:
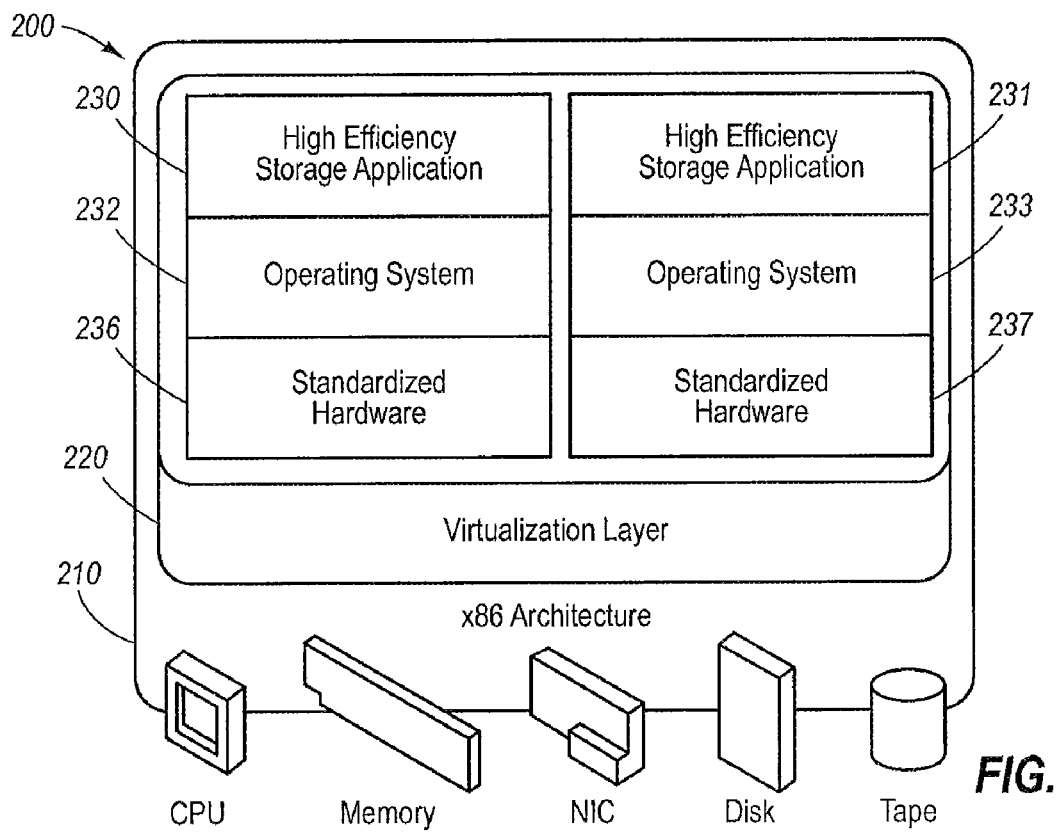
FIG. 2 illustrates a HEPA system according to another embodiment of the invention using a virtualization layer to separate a storage application and associated operating system from a computer architecture.

FIG. 2 illustrates an HEPA system 200 according to the invention. As shown, a computer platform 210 (such as a standard architecture such as the x86 architecture or the like) includes a number of resources such as CPUs, memory, network devices, disk, and tape mechanisms. A virtualization layer 220 is provided to manage access to or "virtualize" the architecture 210 into a uniform pool and separate the hardware of this pool from one or more virtual machines (i.e., the system 200 is shown with 2 such virtual or guest machines running on the virtualization layer 220—but more such machines may be run). The virtualization layer 220 presents a virtualized representation 236, 237 to an operating system 232, 233 of each virtual or guest machine. The operating systems 232, 233 may also vary and may include for example, Windows, Linux, Novell, Solaris, and other operating systems such as FreeBSD and the like. High efficiency storage applications 230, 231 are provided and associated with the instances of operating systems 232, 233 and use the virtual systems 236, 237 to process raw data to create more space efficient versions (e.g., compressed versions compared to the size of the raw data set) that are stored to an archive mechanism in the architecture 210 (such as a tape device or a disk or optical device).

Figure 3:
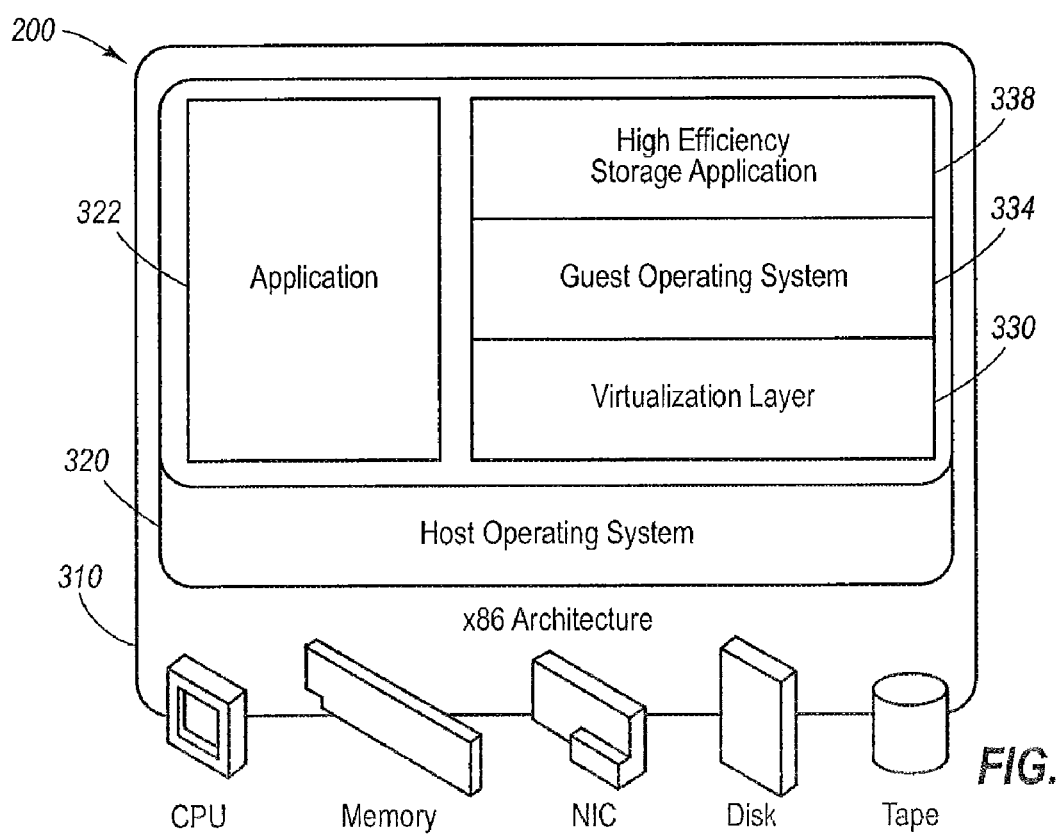
FIG. 3 is another HEPA system of the invention that is similar to that of FIG. 2 but arranged as a hosted architecture.

FIG. 3 illustrates an alternative arrangement for a HEPA system 300 according to the invention. As with system 200, the system 300 includes a set of computer hardware or a particular architecture that is pooled by a virtualization layer 330 and is shielded from a high efficiency storage application 338. However, in this case, the virtual machine includes the virtualization layer 330 and the virtual machine is installed and run as an application, e.g., similar to application 322. The virtualization layer 330 relies on a host OS 320 for device support and physical resource management of the architecture 310 and presents a guest operating system 334 to the storage application 338.

Figure 4:
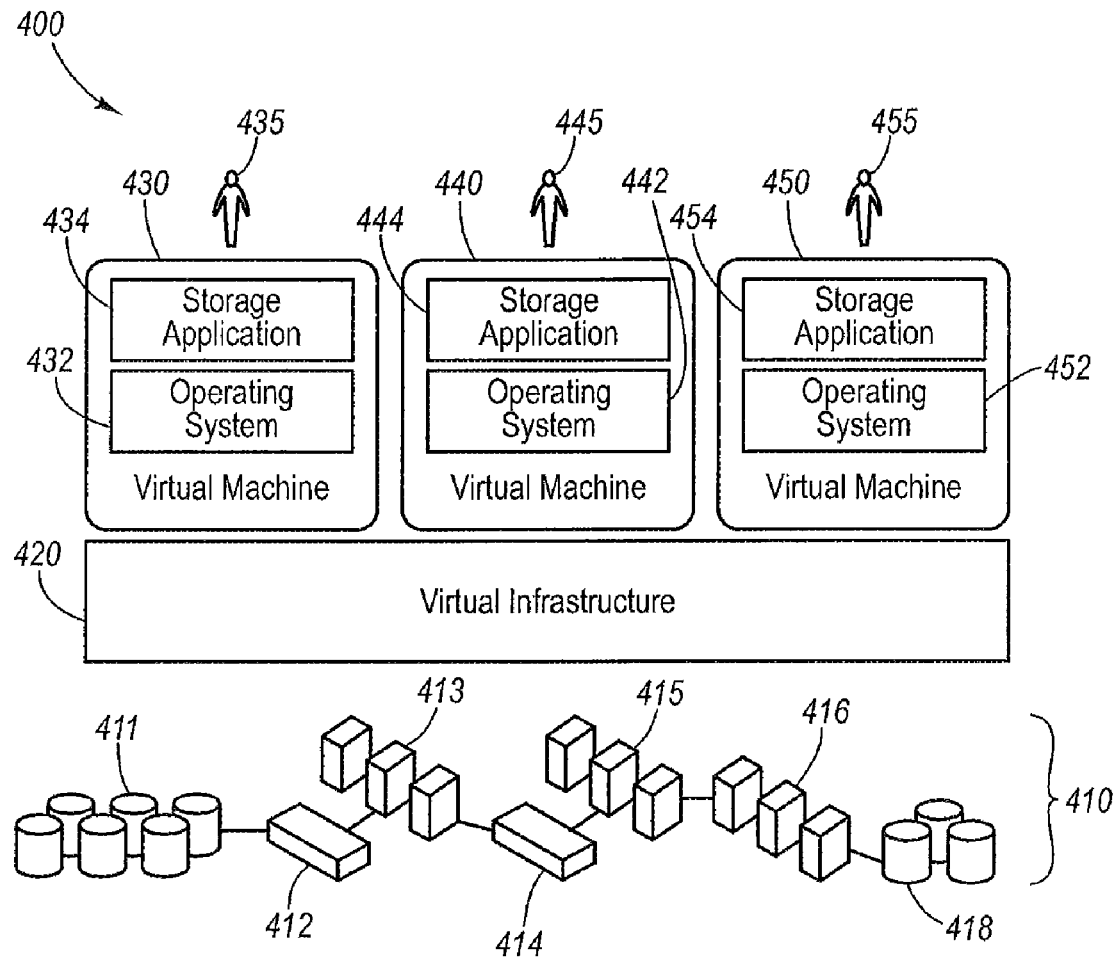
FIG. 4 is yet another HEPA system of the invention illustrating the use of the virtual infrastructure or layer to allow multiple virtual machines to access a computer resources pool including devices used for providing archives of data sets.

FIG. 4 illustrates yet another HEPA system 400 according to the present invention. The HEPA system 400 includes a computer resources pool or computer architecture/platform 410 that includes the hardware and associated software available in the system 400. The pool 410 includes storage 411, 418 that may include nearly any type of storage device for digital data such as tape-based storage devices and systems and disk and optical devices. The pool 410 also includes networks/network devices 412, 414 and a number of servers or other computing devices 413, 415, 416 (which may also be used as data storage in some cases with storage 411, 418 being used for archive or back up storage).

Upon the platform 410, a virtualization infrastructure 420 is provided for connecting the resources in pool 410 to users (or to a business/enterprise) 435, 445, 455. The virtual infrastructure 420 provides a dynamic mapping of the resources in pool 410 to one or more virtual machines 430, 440, 450. Each of the virtual machines 430, 440, 450 runs an operating system 432, 442, 452 and a high efficiency storage application 434, 444, 454. The storage applications 434, 444, 454 may be the same applications (such as Avamar's Avamar) or differ, and each storage application 434, 444, 454 may be ported to data that has been archived according to its high efficiency storing methods and may use its recovery functionality to recover or restore such data on a hardware subsystem within pool 410 provided by virtual infrastructure as being capable of supporting the virtual machine 430, 440, 450 and its associated virtual storage system. For example, point-in-time versions of a data set stored in storage 411 or 418 may be accessed by a virtual machine 430, 440, 450 via one or more of the servers 413, 415, 416 (and/or other resources in pool 410) to recover a desired set of data (e.g., N+N1+Nx or the like), such as based on a recovery request from a user 435, 445, 455.

Figure 5:
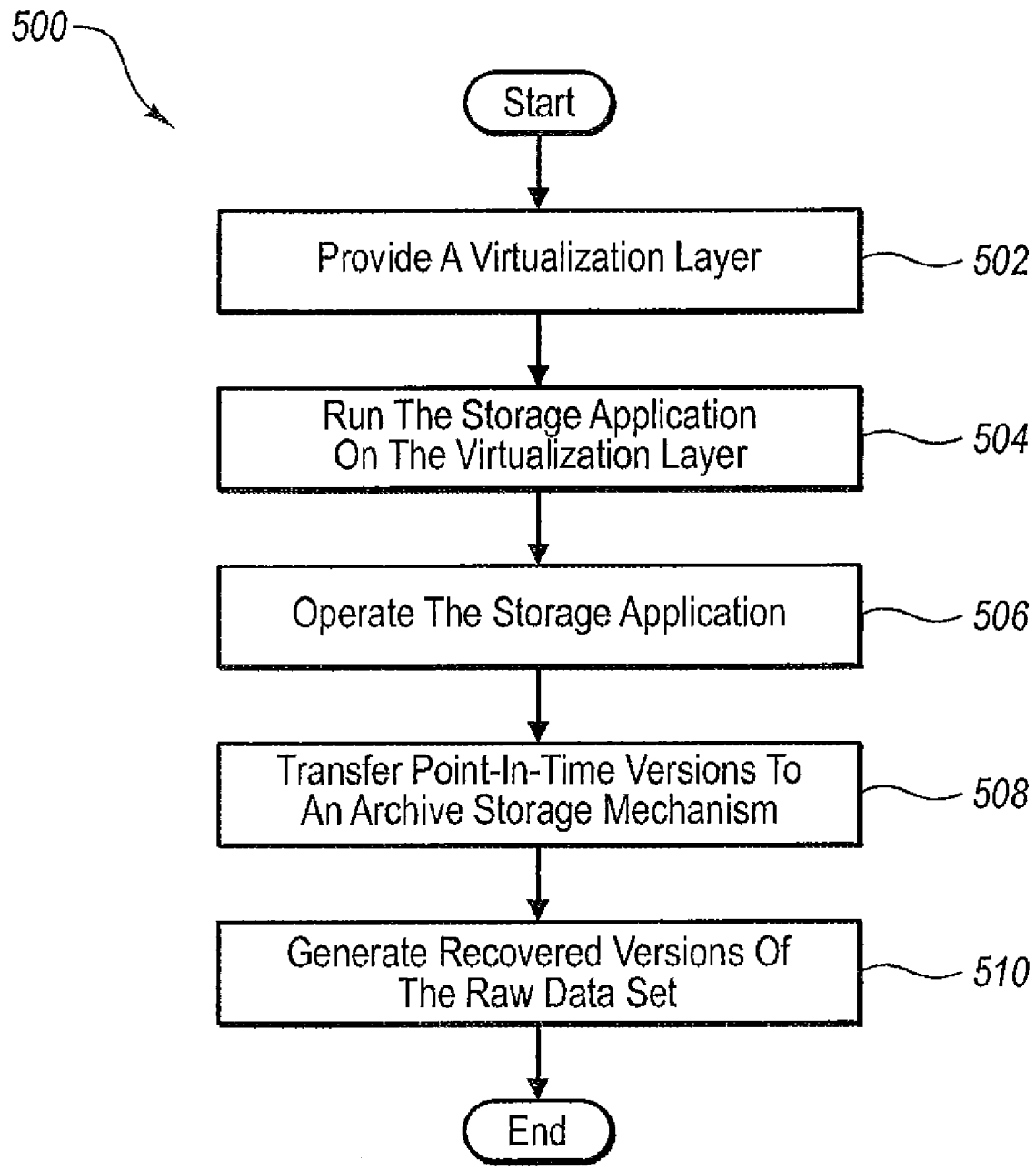
FIG. 5 depicts a method of providing data protection according to one embodiment of the invention.

With reference now to FIG. 5, a method 500 is illustrated for providing data protection. A typical computer architecture in which the method 500 may be implemented includes a storage device on which a raw data set is stored, an archive storage mechanism and one or more hardware components. The process 500 begins by providing 502 a virtualization layer on the computer architecture and running 504 a high efficiency storage application on the virtualization layer. The virtualization layer presents to the storage application a normalized representation of a set of hardware based on components of the computer architecture.

One purpose of the storage application is to generate and store point-in-time versions of the raw data set in the event the raw data set is lost, corrupted, or otherwise damaged. Thus, the storage application is operated 506, as already described above, to generate and store versions of the raw data set.

The point-in-time versions of the raw data set may be moved or copied 508 to the archive storage mechanism by the storage application. They may be transferred to the archive storage mechanism along with the storage application itself as a complete virtual machine environment. Later, the entire virtual machine environment may be transferred or copied into a hardware subsystem where a point-in-time recovery module of the storage application can be used to generate 510 a recovered version of the raw data set in the hardware subsystem. The recovery process may begin in response to a recovery request received by the recovery module from a user.

As discussed above, the virtualization layer or infrastructure (such as those shown in FIGS. 1-4) may take a number of forms to practice the invention. In one embodiment, however, the high efficiency storage application is run on VMware virtualization products such as VMware ESX or GSX (or similar products). Virtualization products such as VMware ESX are relatively well known and understood by those skilled in the art and a full discussion is not believed required here to describe the invention. In other embodiments, the virtualization layer is provided by the virtualization product Xen 3.0 (or other versions) from XenSource, and in other embodiments, virtualization products from Microsoft Corporation and/or Intel Corporation are used to provide the virtualization layer described herein.

As discussed above, high efficiency storage applications of the HEPA systems of FIGS. 1-4 may vary to practice the invention. In one example, the storage application is the Avamar product or suite provided by EMC, Inc. (formerly Avamar Technologies, Inc.) or is based on the high efficiency storage and data recovery methodologies utilized in this software suite. For example, the data storage processes described in U.S. Pat. No. 6,810,398, which is owned by EMC, Inc. which application is incorporated by reference. In other embodiments, CDP or other high efficiency products may be used as the high efficiency storage application, such as, but not limited to: ArcWare, InfoStage, Continuum, or other storage applications distributed by EVault Inc.; LiveVault and other storage applications from Iron Mountain Digital; and high-efficiency storage applications from Network Appliance, Inc.

Additionally, the following description is an overview of the Avamar technology that may be used as part of a high efficiency storage application of the invention. Avamar addresses the need for enterprise data protection and is designed to more effectively address the challenge of data backup and recovery. Avamar solves the challenge of data compression and redundancy of backup data at the source, using patented commonality factoring technology, which reduces or even eliminates redundant data. Avamar agents identify and filter repeated data sequences stored in files within a single system, across systems, and over time at each client so that each unique data sequence is only backed up once within the enterprise, greatly reducing the overall data that must be transmitted over the network and stored within the Avamar system. As a result of this approach, copied or edited files, shared applications, embedded attachments, and even a daily changing database only generate a small amount of incremental storage for an Avamar system.

Avamar's commonality factoring technique allows a changed file to efficiently be analyzed and split into variable sized blocks averaging 12 KB in size, which are then assigned a 20-byte content address based on the contents of the information. Avamar then quickly assesses whether that information has already been stored within the Avamar system (e.g., has already been backed up on this system or another system at some point in the past) and if so, does not backup the data again but stores only the content address pointing to the existing information. By performing this analysis at the client, Avamar effectively delivers a 600-1 reduction (20 bytes sent to represent a 12 KB block of data) for data that is already stored within Avamar, and on average provides greater than 100-1 reduction in backup data when performing daily full backups.

As this description of the Avamar product and technology implies, it is useful in understanding Avamar to fully understand how Avamar acts to find changed files and then break these files into blocks or atomics, e.g., how Avamar selects breakpoints in data sequences to better determine what has been changed and requires backup. This technique may be described as follows: One of the key factors for performing reduction of redundant data at a sub-file level is a method to effectively determine common sequences of data when analyzing large volumes of data. Most techniques for assessing sub-file level changes utilize a simplistic method for analyzing files using fixed block boundaries, which are typically 512 bytes in size. These techniques, however, perform poorly under many circumstances. If a slight change is introduced at the beginning of a file or document, the contents of the entire file get shifted resulting in a fixed block size analysis detecting the entire file as being modified. Avamar has developed a patented method for analyzing sequences of data and dividing the data that addresses the weaknesses of fixed block delta analysis such that common elements may be found on multiple related and unrelated computer systems without the need for communication between the computers and without regard to the data content of the files. This method determines logical or "sticky byte" breakpoints within data sequences to efficiently and effectively divide a data set into pieces that yields optimal commonality. If a document or file is edited such that new information is placed at the beginning of the file and existing data is deleted from the middle of the file, the 'sticky byte' factoring of the file performed by Avamar ensures that only a small percentage of the total file is actually detected as having been modified. This technique is also extremely effective when performing delta analysis of large database dump files, resulting in only a small percentage of the total data being detected as modified (and subsequently backed up over the network) despite changes in tables throughout the database.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for providing data protection, comprising:
   providing a virtualization layer on a computer architecture comprising a storage device storing a raw data set, an archive storage mechanism, and a hardware subsystem;
   running a storage application on the virtualization layer, wherein the virtualization layer presents a representation of a set of hardware based on components of the computer architecture to the storage application;
   operating the storage application to store a plurality of versions of the raw data set in the archive storage mechanism, wherein the raw data set has a size and wherein a size of the plurality of versions of the raw data set is less than the size of the raw data set multiplied by the number of versions stored in the archive storage mechanism; and
   using a recovery module of the storage application to generate a recovered version on the hardware subsystem of the raw data set based on the plurality of versions of the raw data set stored in the archive storage mechanism.

2. The method of claim 1, further comprising porting the storage application to another hardware subsystem.

3. The method of claim 1, wherein the hardware subsystem differs at least partially from hardware components of the computer architecture used in the operating of the storage application to store the plurality of versions of the raw data set in the archive storage mechanism.

4. The method of claim 1, wherein each of the plurality of versions is associated data existing at a differing point in time in the raw data set.

5. The method of claim 1, wherein the hardware subsystem, hardware components of the computer architecture, or both include one or more of:
   a server;
   a network interface controller;
   a central processing unit;
   a memory device;
   a storage device; and
   a network.

6. The method of claim 1, further comprising, prior to using a recovery module of the storage application to generate a recovered version of the raw data set, receiving a recovery request from a user.

7. The method of claim 1, wherein the virtualization layer is provided by one or more of:
   VMware ESX;
   VMware GSX; and
   XEN 3.0.

8. A high efficiency portable archive, comprising:
   a storage application implemented in a computer architecture for generating and storing a plurality of versions of a raw data set in an archive storage mechanism, the raw data set being stored on a storage device of the computer architecture, wherein:
      the raw data set has a size and wherein a size of the plurality of versions of the raw data set is less than the size of the raw data set multiplied by the number of versions stored in the archive storage mechanism;
      the storage application is run on a virtualization layer, the virtualization layer presenting a representation of a set of hardware based on components of the computer architecture to the storage application; and
      the storage application can be ported to a hardware subsystem even though hardware components of the computer architecture used in the operating of the storage application differ from the hardware subsystem.

9. The archive of claim 8, wherein the storage application reduces the size of the plurality of versions by implementing one or more of:
   snapshots;
   file differencing;
   content addressed storage;
   continuous data protection; and
   commonality factoring.

10. The archive of claim 8, wherein the storage application includes a recovery module for generating a recovered version on the hardware subsystem of the raw data set based on the plurality of versions of the raw data set stored in the archive storage mechanism.

11. The archive of claim 8, wherein the storage application and versions of the raw data set are copied to the archive storage mechanism as a virtual machine.

12. The archive of claim 8, wherein the computer architecture comprises a x86 computer architecture.

* * * * *